United States Patent [19]

Monne

[11] 4,172,423
[45] Oct. 30, 1979

[54] TRACKED VEHICLE SYSTEMS

[76] Inventor: Maxime Monne, 19 bis, boulevard Delessert, 75016 Paris, France

[21] Appl. No.: 857,670

[22] Filed: Dec. 5, 1977

[30] Foreign Application Priority Data

Dec. 10, 1976 [FR] France .............................. 76 38018

[51] Int. Cl.² ...................... B61B 3/02; B61C 13/04; B60M 7/00; E01B 25/22
[52] U.S. Cl. ........................................ 104/94; 104/89; 104/107; 104/111; 105/30; 105/148; 105/155; 191/23 A
[58] Field of Search ..................... 104/89, 94, 95, 106, 104/107, 108, 111, 172 S; 105/30, 148, 154, 155, 156; 191/23 A

[56] References Cited

U.S. PATENT DOCUMENTS

| | | | |
|---|---|---|---|
| 1,161,869 | 11/1915 | Kerns | 104/94 |
| 1,312,417 | 8/1919 | Mosher | 105/155 |
| 3,039,401 | 6/1962 | Bishop | 104/94 X |
| 3,392,244 | 7/1968 | Hillmann | 104/94 X |
| 3,829,175 | 8/1974 | Vogeli | 105/155 X |
| 3,854,406 | 12/1974 | Monne | 104/94 |
| 3,987,877 | 10/1976 | Bulanchuk | 104/94 X |

FOREIGN PATENT DOCUMENTS

| | | | |
|---|---|---|---|
| 432859 | 8/1926 | Fed. Rep. of Germany | 104/94 |
| 2016528 | 10/1970 | Fed. Rep. of Germany | 191/23 A |
| 17780 | of 1905 | United Kingdom | 105/155 |
| 1006564 | 10/1965 | United Kingdom | 104/94 |

Primary Examiner—Randolph A. Reese
Attorney, Agent, or Firm—Karl F. Ross

[57] ABSTRACT

A tracked vehicle system comprises a load-carrying vehicle formed by two bogies each of which has two co-axial rollers, the two bogies being connected by an articulating spindle carrying a centering roller arranged to bear against the internal sides of the track. Each bogie preferably carries a steering roller rotatable about a vertical axis and situated substantially in the same plane as the centering roller.

22 Claims, 13 Drawing Figures

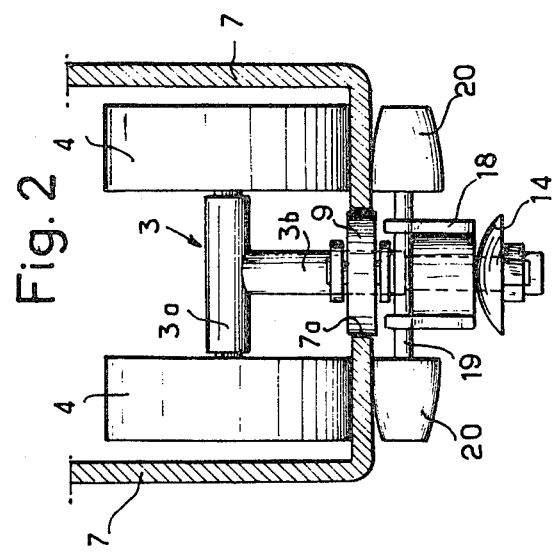
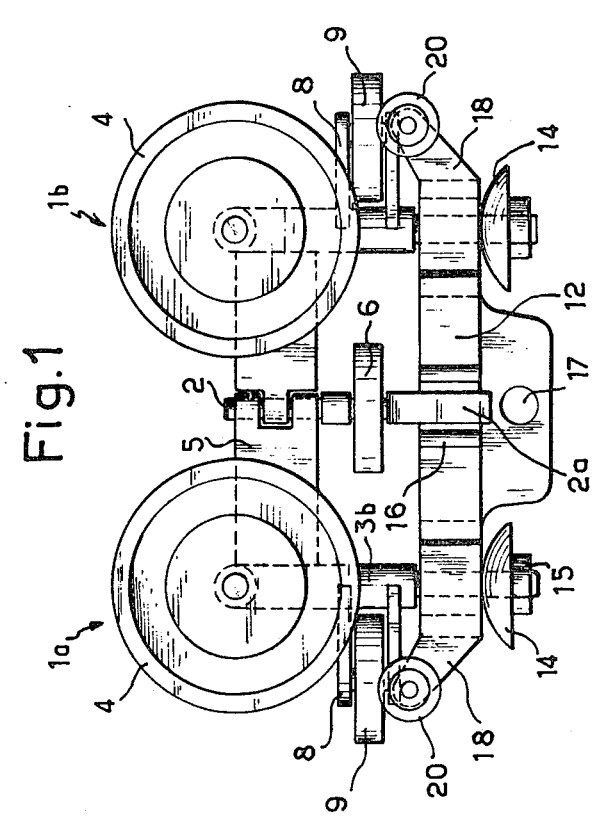
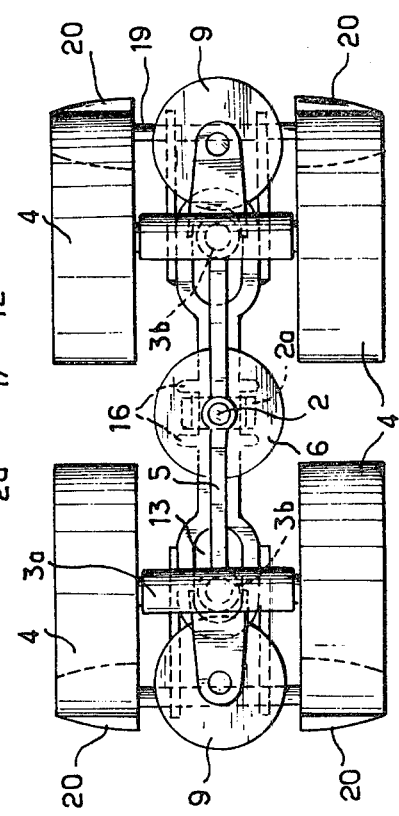

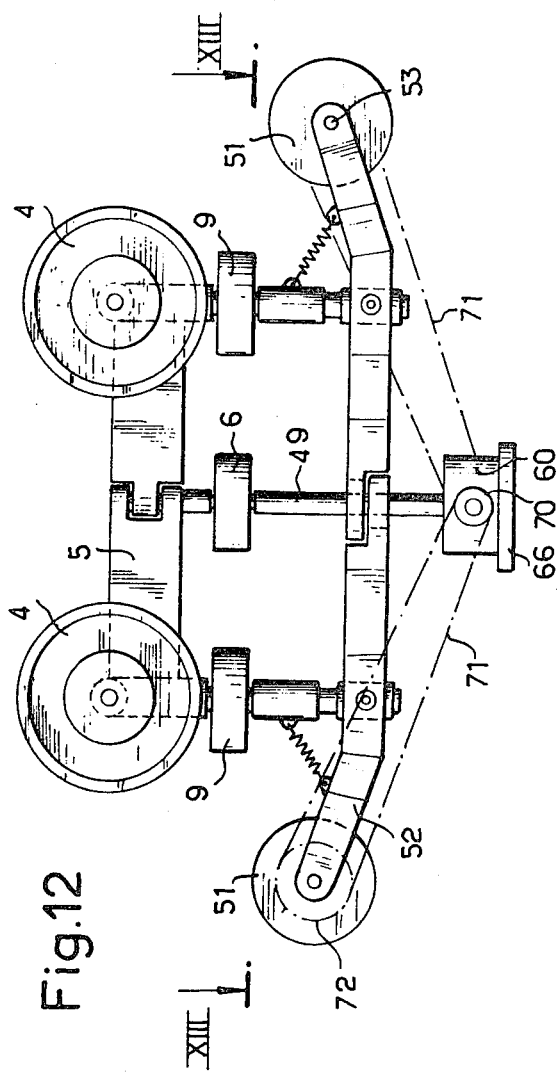
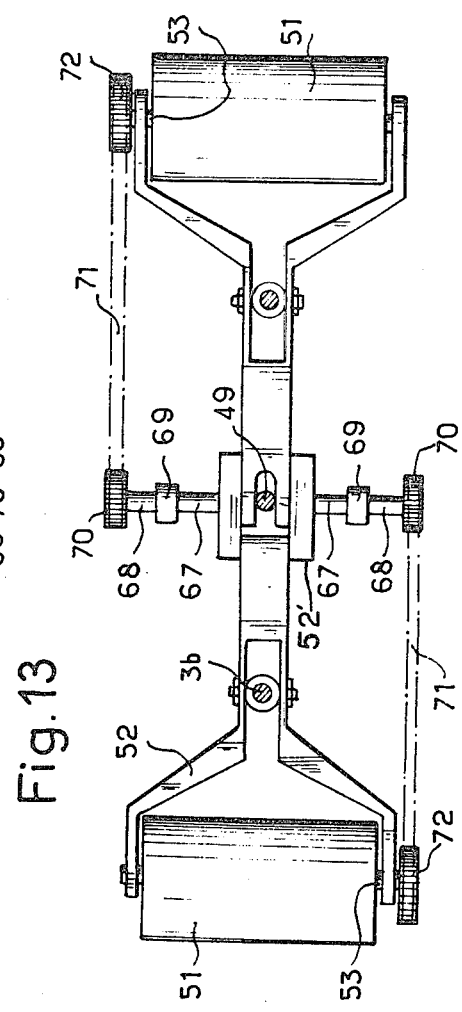
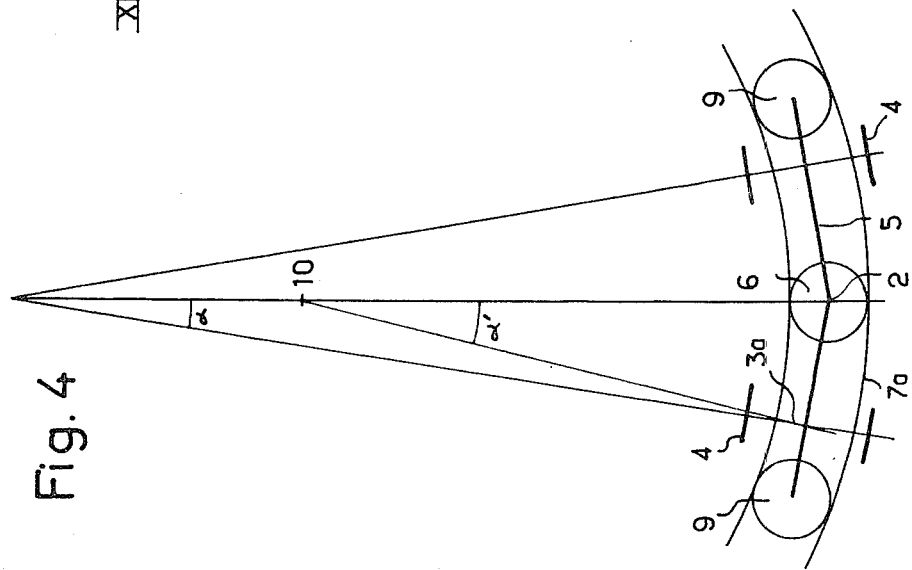

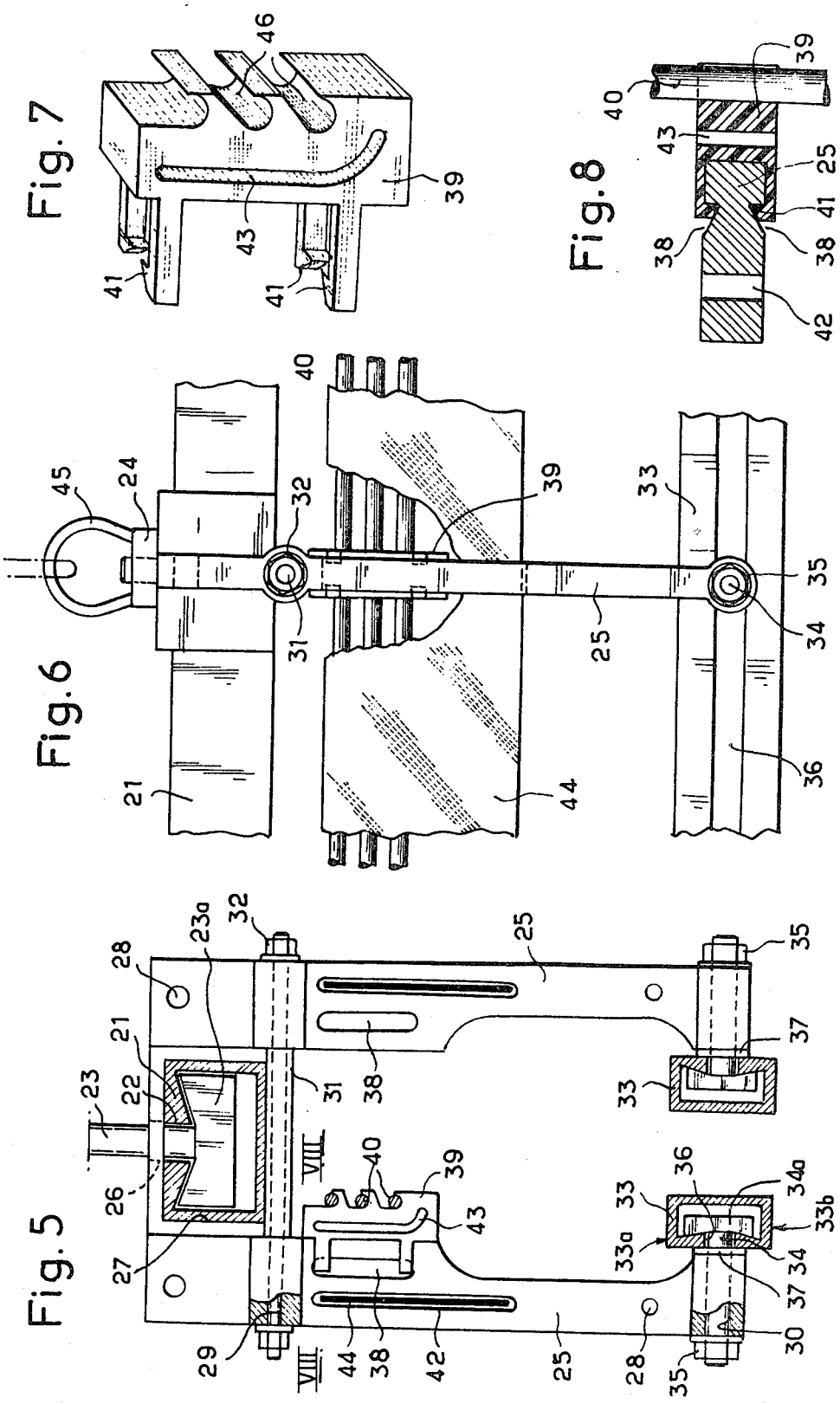

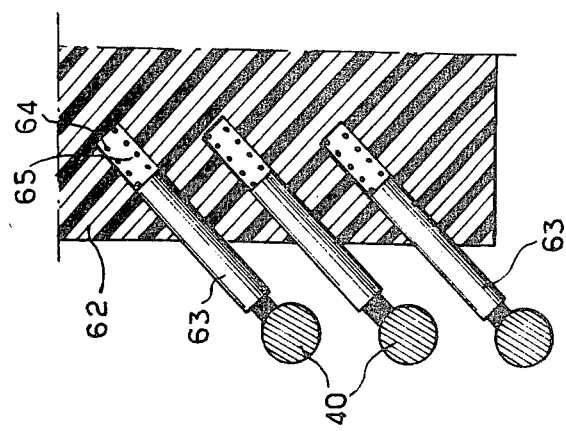
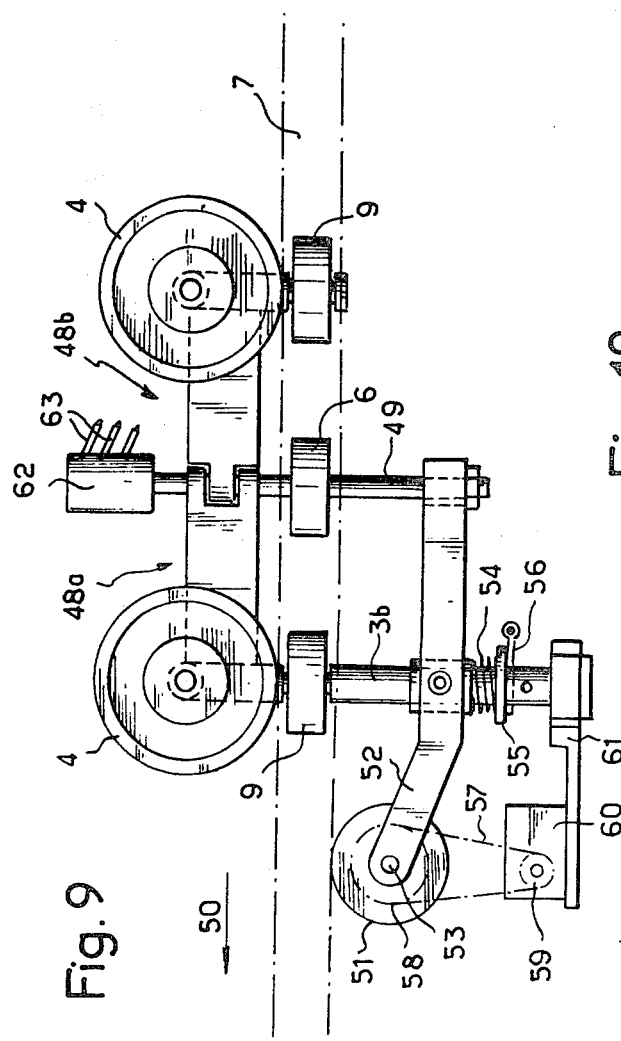
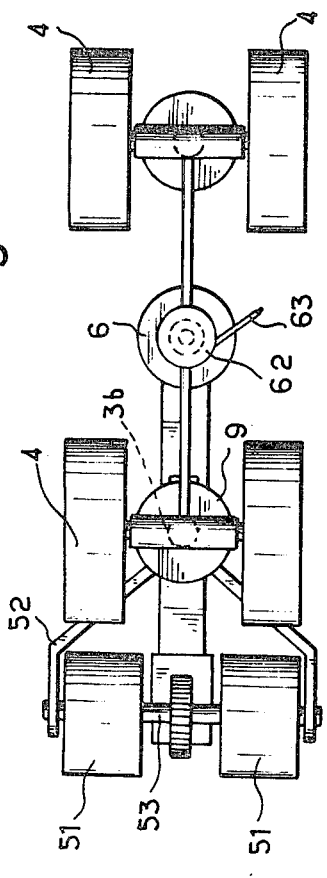

TRACKED VEHICLE SYSTEMS

BACKGROUND OF THE INVENTION

1. Field of the Invention

The present invention relates to tracked vehicle systems, such as conveyors or monorails.

2. Description of the Prior Art

The tracks or rails, whether overhead or ground mounted, of tracked vehicle systems in the form of conveyors or monorails, tend to wear comparatively rapidly along bends, more particularly at the entry of the bends. The metal of the track, under the trace left behind by the passage of the rollers or wheels of the vehicles has small discontinuous facets in the form of scales which finally tear off. This action, known as "pitting", requires frequent track changing.

Pitting is caused by the fact that, at the entry to a bend, the rollers advance in canted manner with respect to the vertical plane of their rolling direction.

OBJECT OF THE INVENTION

The present invention has as its object a tracked vehicle system in which such pitting of the track is substantially eliminated.

SUMMARY OF THE INVENTION

According to the invention, there is provided in a tracked vehicle system, means defining a track having internal surfaces, and a load-carrying vehicle movable on the track and comprising two bogies each having two co-axial rollers, means defining a spindle articulating the two bogies, and a centering roller carried by the spindle, said centering roller being arranged to bear against said internal surfaces of the track.

In an advantageous embodiment of the invention, each bogie has a steering roller having a vertical axis and which is situated substantially in the same plane as the centering roller, this vertical axis being situated in the vertical plane containing the axis of the rollers of the bogie, or externally with respect to this plane.

Each of the bogies may carry a load, the latter being suspended from a bar rigid with the spindle of the rollers of the bogie. However, the distance between the loads then varies along bends in the track. To eliminate this disadvantage, the load-carrying vehicle comprises a rocking supporting lever which is pivotally journalled around the articulating spindle of the bogies at the lower part of this spindle, the end portions of this lever being of fork shape or otherwise provided with elongate openings and being traversed by guiding elements rigid with the bogies.

In order to prevent weakening of the rocking lever, the lever may be engaged in a flange or bearer carried by the lower end portion of the articulating spindle and may be equipped at either side of the flange with projections limiting its displacement with respect to this flange.

The rocking lever may comprise buffers at its ends. It may also be provided with anti-tipping rollers or wheels arranged to engage against the underside of the track. These rollers may have a frustoconical shape with a curved generatrix; they may then act as buffers.

According to another feature of the invention, the system comprises a drive vehicle constructed in a similar manner to the load-carrying vehicle and equipped, in front of the spindle of the rollers of the front bogie, with at least one driving wheel which is rotatably mounted in a bearer pivotally mounted on the articulating spindle of the bogies and on a spindle rigid with the front bogie. The wheel is connected to a driving motor or engine carried by the bogie.

Advantageously, two driving wheels may be mounted on a common spindle and situated at respective sides of the longitudinal center plane of the vehicle.

The bearer may be connected to the articulating spindle of the bogies by means of a fork forming part of the bearer and traversed by the articulating spindle, the bearer being connected via a ball-joint to the spindle rigid with the front bogie. In this manner it is then possible to pivot the bearer to move the driving wheel or wheels away from the surface of the track.

If the drive vehicle is to drive a load-carrying vehicle or a series of load-carrying vehicles in both directions, it should be equipped with driving wheels at each end, with each driving wheel being situated externally with respect to the support rollers. It may comprise a separate motor for each of the driving wheels. It is, however, possible to use a single driving motor or engine carried by a support secured to the lower part of the articulating spindle of the bogies, the shaft of this motor being joined to the spindle of each of the driving wheels, or of each pair of wheels, via a universal joint or via a transmission gear comprising twin sliding universal joints.

Current supply to the motor of the vehicle may be provided via a brush holder pivotally mounted on the articulating spindle of the bogies or on a spindle situated in the vertical plane containing the axis of the bearing rollers of the bogie. In the case in which the vehicle is displaced in one direction only, the brushes may be formed by conductive bars directed towards the rear of the vehicle and applied resiliently against current supply lines carried by the track.

The track may be of any suitable form. In a preferred embodiment of the invention however, the track comprises a supporting section intended to receive fastening bolts and having in its upper part, a longitudinal opening allowing the passage of the shanks of these bolts, a series of supporting links of C-shape being secured to the section by the bolts. Two hollow rails are secured to the limbs of the links.

Each link may have holes rendering it possible to stay the links in pairs. It may also have transverse holes substantially flush with the base of the section and/or at the lower part of each of its limbs.

The transverse holes incorporated flush with the base of the section permit traversal by a clamping pin, securing a complementary section, or the addition of reinforcing sections in the form of angle irons. The transverse holes incorporated in the lower part of each of the limbs of the links permit the rails to be secured to the limbs.

In each of the limbs, each of the links may incorporate an elongate opening or two separate openings for securing racks for carrying the current supply lines. Each of its limbs, or the rack, may comprise a vertical slot for a protective strip of insulating material.

The track may be constructed in such a manner as to correctly support its load by appropriately selecting the spacing of the links. This is of interest in arrangements in which the loads may travel rapidly along a considerable length for subsequent storage side-by-side along a track section. The track is assembled from a small number of readily-available components. The rails are easily replaceable without the need to dismantle the track as a whole; each rail is reversible and may consequently be used again being turned over. Connection is easy and each section may be cut to length by means of portable site equipment, without painstaking or complex machining of cuts. Each track section may be held at any point by rigid bracing or by guying, which may, or may not, slope with respect to the vertical. The track may receive reinforcements to increase the vertical or transversal moments of inertia, without the need to perform special machining operations or to use special sections. It permits uncomplicated securing of an electrical, electronic or mechanical device to pick up or provide analogical data. It allows easy fitting of the current supply lines. Finally, it may be applied on bends of small radius and may comprise points, crossings or lift stations.

BRIEF DESCRIPTION OF THE DRAWINGS

Embodiments of the invention will now be described, by way of example only, with reference to the accompanying drawings, in which:

FIG. 1 is an elevation of a load-carrying vehicle of a tracked vehicle system in accordance with the invention;

FIG. 2 is an end view of the vehicle;

FIG. 3 is a plan view of the vehicle;

FIG. 4 is a diagram showing how the load-carrying vehicle is positioned along a bend in the track;

FIG. 5 is a cross-section of the track;

FIG. 6 is an elevation, with portions cut away, of a part of the track;

FIG. 7 is a perspective view showing current supply lines of the track;

FIG. 8 is a cross-section taken on line VIII—VIII of FIG. 5;

FIG. 9 is an elevation of a drive vehicle;

FIG. 10 is a plan view of the drive vehicle;

FIG. 11 is a cross-section of a brush holder of the drive vehicle;

FIG. 12 is an elevation of another form of drive vehicle; and

FIG. 13 is a plan view of the drive vehicle of FIG. 12.

DESCRIPTION OF THE PREFERRED EMBODIMENTS

With reference to FIGS. 1 to 3, the load-carrying vehicle comprises two "bissel" or radial bogies 1a and 1b joined to each other by a vertical articulating spindle 2. Each of the bogies 1a, 1b comprises a T-shaped bearer 3 (see FIG. 2) of which the upper horizontal bar 3a forms an axle carrying, at its ends, rolling wheels 4 referred to herein simply as "rollers", whereas its vertical bar 3b is rigid with a coupling plate 5. The end of the plate 5 is in the form of a bearing, the bearings of the two plates 5 being joined together by the spindle 2.

At its lower part, the spindle 2 carries a centering roller 6. This roller is situated a little below the rollers 4 and is dimensioned in such a manner that when the rollers 4 rest on two rails 7, the centering roller 6 is positioned between these two rails, practically in contact with their inner faces 7a (FIG. 2). Each of the vertical bars 3b is rigid with a flange 8 which extends towards the outside of the bogie and which pivotally mounts a steering roller 9 situated in the same plane as the centering roller 6.

When the vehicle is situated on a curved part of the track, the centering roller 6 and the steering rollers 9 co-operate with the inner faces 7a of the rails 7 (see FIG. 4) to guide the bogies in such manner that the axes of the axles 3a pass substantially through the instantaneous center 10 of the curved track. There is no "pitting" subject to the condition that the difference of the angles $\alpha$ and $\alpha'$ subtended between a line at right angles to the track and passing through the center of the roller 6 and, respectively, the axis of the axle 3a and the straight line joining the center of this axle to the instantaneous center 10, is smaller than the pitting angle, the value of this latter being a function of the vertical load and of the materials used for the rollers 4 and the track.

The vehicle also comprises a rocking lever 12 having at each end an elongate hole 13 traversed by one of the bars 3b, each end of the lever 12 being supported by a foot bearing 14 secured by a nut 15 with the interpositioning of a load-carrying washer of anti-friction material or of a thrust ball bearing. This rocking lever passes through a lower, fork-shaped, end portion 2a of the spindle 2 and is fixed longitudinally with respect to the spindle 2 by projections 16. In this manner the central axis of the rocking lever coincides with the spindle 2 while a variation of the spacing between the bars 3b of the bogies is rendered possible by longitudinal movement of these bars in the elongate holes 13.

In its central part, the rocking lever 12 comprises an opening 17 from which a load may be suspended, for example by means of a shackle. At each of its ends, the lever 12 also has a clevis bracket 18 carrying a spindle 19 for two frustoconical rollers 20 having a curved generatrix. The rollers 20 are engaged beneath the rails 7 and prevent possible tipping of the vehicle. They also form buffers, when a row of vehicles coupled one behind another is situated on a bend.

The described vehicle may be used with any suitable type of track. However, a preferred track structure is illustrated in FIGS. 5 to 8. In these figures, the track comprises a supporting section 21 which extends throughout the length of the track and is formed by a square or rectangular section tube having, in its upper surface, an opening 22 traversed by bolts 23. The head 23a of each bolt 23 has a shape corresponding to that of the internal surface of the upper side of the tubular section 21, the bolt head 23a being of rectangular cross-section with a smaller thickness than the width of the opening 22. To place the bolt 23 in position in the tubular section 21, it is inserted into the tubular section 21 via the opening 22 with the head extending in the longitudinal direction of the tubular section and thereafter the head is turned through 90°. Upon tightening a nut 24, the head 23a of the bolt 23 is applied against the upper part of the tubular section.

The opening 22 preferably has swaged-over edges, tapering edges, or edges increasing in thickness from the outside of the tubular section towards the opening 22 as illustrated in FIG. 5. These arrangements prevent the bolt 23 from turning upon tightening the nut 24.

A series of supporting links 25 of C-shape, which in their upper part have a hole 26 traversed by the bolt 23 and a rectangular opening 27 the surface of which acts as a support for the tubular section 21, are engaged on the tubular section 21. Each of the links 25 has longitudinal holes 28 to enable pairs of links to be secured in pairs by means of tubes mounted on rods of which the ends are screw-threaded and carry securing nuts. Each link 25 also has transverse holes 29 situated flush with the outside of the opening 27 and transverse holes 30 in the lower part of each of its limbs. The transverse holes 29 are each traversed by a screw-headed rod or bar 31 which in co-operation with nuts 32 acts to clamp the link on the tubular section 21. These holes also allow securing a complementary section by means of dogs, and/or the addition of reinforcements in the form of angle sections.

A rail 33 is secured to the lower part of each of the limbs of the link 25 by means of a bolt 34 and nut 35. The rail 33 is formed like the section 21, that is to say that it comprises a square or rectangular section tube having in one of its longitudinal sides an opening 36 traversed by bolts 34. The head 34a of each bolt 34 has an outline corresponding to that of the inner surface of the longitudinal side of the section and has a rectangular cross-section and a smaller thickness than the width of the opening 36. The insertion of the bolts 34 in the rail 33 is performed in the same manner as that of the bolts 23 in the section 21. The opening 36 preferably has swaged-over edges, tapered edges or, as illustrated, edges increasing in thickness in such manner as to prevent the bolts 34 from turning, upon tightening nuts 35.

When the upper surface 33a of the rail 33 has become worn, it is sufficient along the rectilinear sections of the track, to remove the rail and to place it in position again after it has been turned through 180° in such manner that the surface 33 which was originally the lower surface, now becomes the upper surface. Along the curved sections, the inner and outer rails are interchanged after a minor reshaping operation to make allowance for the difference in the radii between the inner and outer rails.

A spacer washer 37 may be interposed between the limb of the link and the rail 33 so as to accurately set, or gauge, the spacing between the two rails.

Two adjacent supporting sections 21 or rails 33, can readily be coupled by locating two bolts 23 or 34 into the members which are to be coupled and by connecting these two bolts by means of an external plate positioned at either side of the gap. Below a point of support, the coupling may be effected by securing two links 25 side-by-side.

Each of the limbs of the link 25 has two blind opposed seats 38, or a through-going aperture, which enable a carrier which is optional, to be secured by means of clips. In the embodiment illustrated, one of these seats serves the purpose of securing a carrier in the form of a rack 39 of molded plastic material for supporting electrical supply lines 40. The rack 39 has integral projections 41 in the form of catches engaging resiliently in the seats 38.

Each of the limbs of the link 25 or each of the racks 39 may comprise a vertical slot 42 or 43 arranged to receive an insulating strip such as 44 extending throughout the length of the track and intended to prevent the user from touching the supply lines 40 unintentionally, if the voltage requires this. The slot 43 may be slightly curved inwards at its lower end to increase the protection afforded for the lowermost supply line 40.

The bolt for securing the link 25 on the supporting section 21 may be replaced by a bolted shackle 45 which may be secured by a loop or shackle fastened to a guy line or a tensioner. It may alternatively be received by a cross-piece, for example of U-section. It may also serve the purpose of supporting electric cables, pneumatic and/or hydraulic ducting.

The supply lines 40 may simply comprise copper tubes, the connection between two adjacent tubes being provided by means of swallow-tail taper plugs. The supply lines are laid in the racks 39 which, for this purpose, are equipped with seats 46 extending over a little more than 180°, the insertion of a line into its seat occurring under light pressure. The line 40 thus has an uncovered surface over which may pass a brush inclined at approximately 45° and in contact with the line over an arc of 45°. To prevent any lateral slipping, open clips which are not illustrated are installed over each line 40 at either side of the link 25.

FIGS. 9 and 10 show a drive vehicle for pulling a series of load-carrying vehicles such as those illustrated in FIGS. 1 to 3. The drive vehicle has a general configuration analogous to that of a load-carrying vehicle, that is to say that it comprises two "bissel" bogies 48a and 48b which are interconnected by a spindle 49 carrying a centering roller 6 and which are each equipped with rollers 4 and a steering roller 9.

The drive vehicle is intended to be driven in the direction of the arrow 50 in FIG. 4. Two driving rollers or wheels 51 are rotatably journalled in a bearer or yoke 52 which is itself joined via a swivel joint to the vertical bar 3b of the front axle and is terminated by a fork 52' acted upon by the spindle 49. Under these conditions, when the vehicle is on a curved section of the track, the axle 53 of the wheels 51 is always directed substantially towards the instantaneous center of curvature of track. The yoke 52 may slide on the bar 3b, and a spring 54 which bears on a washer 55 secured by a pin 56, resiliently thrusts the wheels 51 against the lower surface of the track. A belt 57 connects a pulley 58 keyed on the axle 53 to a pulley 59 keyed on the output shaft of an electric motor 60. This motor is carried by a support 61 which is secured to the lower part of the shaft 3b.

When the motor 60 is in operation, it drives the vehicle in the direction of the arrow 50. If it is required to displace the vehicle by hand, it is sufficient to withdraw the pin 56 so that the yoke 52 drops whereby the wheels 51 are no longer in contact with the track.

To provide a current supply for the motor 60, a collector holder 62 is pivotally mounted on the upper end of the spindle 49. Current collectors or brushes 63, for example of copper or graphite, and preferably of flat cross-section, are slidably installed in bores 64 of the holder 62 and are biased outwardly by springs 65. The bores 64 are rearwardly and downwardly directed, in such manner that the brushes 63 are thrust against the supply lines 40 while trailing (FIG. 11). The operative end of each brush is cut or shaped to match the cross-sectional shape of the supply line. The brushes may be sheathed in insulating material of high dielectric capacity, with the insulation being stripped from the brushes at their operative end.

In a modified arrangement (not shown), the brush holder is formed by a saddle articulated on the upper part of the spindle 49 and arranged in such manner that the brushes are in contact with the supply lines in the vertical plane passing through the axis of the rear rollers 4.

If the drive vehicle is to be displaceable in both directions, a driving wheel 51 should be incorporated at each end of the vehicle (see FIGS. 12 and 13), externally with respect to the rollers 4. A single motor 60 may be incorporated for driving the two wheels 51 which in the embodiment shown are of elongate cylindrical form. The motor 60 is carried by a carrier 65 secured to the lower part of the spindle 49, the motor 60 having two lateral output shafts 67 each of which is coupled to a respective shaft 68 by means of an "Oldham" joint 69. The shaft 68 carries a sprocket 70 coupled by a chain 71 to a sprocket 72 keyed on the axle 53 of one of the wheels 51.

What is claimed is:

1. A tracked vehicle system, comprising means defining a track having internal surfaces, and a load-carrying vehicle movable on the track and comprising two bogies each having two co-axial rollers, means defining a spindle articulating the two bogies, a centering roller carried by the spindle, said centering roller being arranged to bear against said internal surfaces of the track, a rocking supporting lever on said vehicle pivotally mounted on the lower part of said spindle articulating the bogies, means defining an elongate opening at each end portion of the lever, and guiding elements rigid with said bogies and located in said openings.

2. A tracked vehicle system according to claim 1, wherein the vehicle further comprises a yoke carried at the lower end portion of the articulating spindle, and said lever being engaged in said yoke and having protections limiting its displacement with respect to said yoke means.

3. A tracked vehicle system according to claim 1, wherein the said lever comprises buffer means at each end portion.

4. A tracked vehicle system according to claim 1, wherein the vehicle further comprises anti-tipping rollers arranged to engage the underside of the track.

5. A tracked vehicle system according to claim 4, wherein said anti-tipping rollers are of frustoconical shape with a curved generatrix.

6. A tracked vehicle system according to claim 1, wherein each said bogie has a steering roller mounted for rotation about a vertical axis, said steering roller being situated substantially in the same plane as the centering roller.

7. A tracked vehicle system according to claim 6, wherein the axis of the steering roller is located in a vertical plane perpendicular to the plane containing the axes of the said co-axial rollers of the bogie.

8. A tracked vehicle system according to claim 6, wherein the axis of the steering roller is located externally of a vertical plane containing the axis of the said co-axial rollers of the bogie.

9. A tracked vehicle system according to claim 1, wherein the track comprises a supporting section having a longitudinal opening in an upper part, a series of C-shaped supporting links engaged on the supporting section, bolt means engaged in the section and having shanks extending through said opening to secure the links to the supporting section, two hollow rails each having a longitudinal opening in a side thereof, and bolt means engaged with the rails and having shanks extending through the openings therein to secure the rails to the links.

10. A tracked vehicle system according to claim 9, wherein each said link has holes to receive means for securing together pairs of links.

11. A tracked vehicle system according to claim 9, wherein each link has transverse holes substantially flush with the base of the section.

12. A tracked vehicle system according to claim 9, wherein each link has transverse holes in the lower part of each of its limbs.

13. A tracked vehicle system according to claim 9, wherein each said link has, in each of its limbs, an opening for securing a supporting rack for carrying current-supply lines.

14. A tracked vehicle system according to claim 13, wherein the track further comprises a supporting rack carrying current-supply lines, said rack having a vertical slot, and a protective strip of insulating material engaged in said slot.

15. A tracked vehicle system according to claim 13, wherein each said link has, in each of its limbs, a vertical slot, and a protective strip of insulating material engaged in said slot.

16. A tracked vehicle system, comprising means defining a track having internal surfaces, and a load-carrying vehicle movable on the track and comprising two bogies each having two co-axial rollers, means defining a spindle articulating the two bogies, a centering roller carried by the spindle, said centering roller being arranged to bear against said internal surfaces of the track, a drive vehicle for driving the load-carrying vehicle along the track, said drive vehicle comprising two drive-vehicle bogies each having two co-axial rollers, means defining a drive-vehicle spindle articulating the two bogies, a centering drive-vehicle roller carried by said drive-vehicle spindle and arranged to bear against the internal surfaces of the track, drive-vehicle yoke means pivotally mounted on said drive-vehicle spindle, spindle means rigid with one of said drive-vehicle bogies and pivotally mounting the drive-vehicle yoke means, driving wheel means mounted on said drive-vehicle yoke means and lying in front of said one of said drive-vehicle bogies, and driving motor means coupled to said driving wheel means.

17. A tracked vehicle system according to claim 16, wherein said driving wheel means comprises two driving wheels and a common spindle for said driving wheels, said driving wheels being located at respective sides of a longitudinal central plane of the drive vehicle.

18. A tracked vehicle system according to claim 16, wherein said drive vehicle further comprises swivel joint means connecting the drive-vehicle yoke means to said spindle means, said drive-vehicle yoke means including fork means traversed by the said articulating spindle, said fork means connecting the yoke means to said articulating spindle.

19. A tracked vehicle system according to claim 16, wherein the drive vehicle comprises further driving wheel means located externally with respect to the other of said bogies.

20. A tracked vehicle system according to claim 19, wherein the driving motor comprises a single driving motor for driving both said driving wheel means, and a carrier secured to the lower part of the said articulating spindle, the said carrier mounting said driving motor.

21. A tracked vehicle system according to claim 16, wherein the drive vehicle further comprises a holder for current-collecting brushes, said holder being pivotally mounted on the drive vehicle.

22. A tracked vehicle system according to claim 21, wherein the track comprises current-supply lines, and the drive vehicle further comprises current-collecting brushes carried by the holder and applied resiliently against the supply lines, said brushes being directed towards the rear of the drive vehicle.

* * * * *